Figure 1:
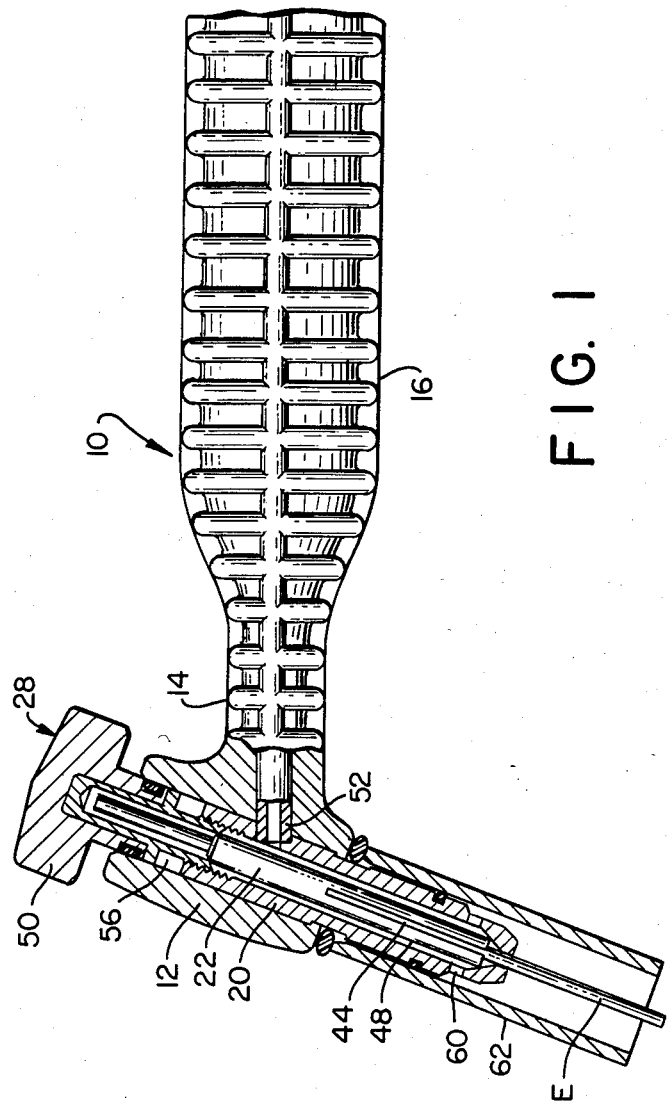

United States Patent [19]

Hill

[11] Patent Number: 4,543,461
[45] Date of Patent: Sep. 24, 1985

[54] GAS SHIELDED ARC TORCH AND COLLET ASSEMBLY

[75] Inventor: Clifford W. Hill, Florence, S.C.

[73] Assignee: Union Carbide Corporation, Danbury, Conn.

[21] Appl. No.: 566,830

[22] Filed: Dec. 29, 1983

[51] Int. Cl.⁴ .................................................. B23K 9/28
[52] U.S. Cl. ........................................ 219/75; 219/74
[58] Field of Search ............................ 219/74, 75, 136

[56] References Cited

U.S. PATENT DOCUMENTS

| | | | |
|---|---|---|---|
| 3,053,968 | 9/1962 | Gorman et al. | 219/74 |
| 3,272,958 | 3/1964 | Hill et al. | 219/75 |
| 3,522,406 | 2/1969 | Sipos et al. | 219/74 |
| 3,794,806 | 2/1974 | Klasson | 219/75 X |
| 4,309,588 | 1/1982 | Hill | 219/75 |

Primary Examiner—Roy N. Envall, Jr.
Assistant Examiner—Catherine M. Sigda
Attorney, Agent, or Firm—Eugene Lieberstein

[57] ABSTRACT

A gas shielded arc torch for welding or cutting having a torch head surrounding a collet assembly including a collet body and a slotted collet for gripping and positioning an electrode within the torch head and a torch cap for locking the collet within the collet body. The torch cap has a taper for engaging the unslotted end of the collet and the collet body has a taper for engaging the slotted end of the collet. The taper in the torch cap is substantially larger than the taper in the collet body.

7 Claims, 2 Drawing Figures

GAS SHIELDED ARC TORCH AND COLLET ASSEMBLY

This invention relates to gas shielded arc welding or cutting torches and more particularly to a collet assembly for a preferably nonconsumable tungsten electrode inert gas shielded welding torch which is known in the art and referred to hereinafter as a TIG torch.

BACKGROUND OF THE INVENTION

The collet assembly for a welding or cutting torch includes a slotted collet for receiving the electrode in combination with a collet body for centering and fixing the position of the electrode within the torch head. Heretofore, it was the conventional practice to machine a taper in the slotted end of the collet to match a complimentary shaped conical wall in the collet body. The collet was also machined to form an annulus between the collet and the collet body along one section of its length and to provide a shoulder conforming to the diameter of the collet body at the opposite end of the collet. To manufacture a collet having these features it was necessary to perform a multiple number of machining operations including drilling, reaming, countersinking and beveling. These operations had to be performed with a relatively high degree of accuracy so that the electrode would be centered accurately within the torch body. Since the collet is intended to be a disposable part which performs an essential function the manufacturing cost of this item is very significant to the overall cost of the torch.

SUMMARY OF THE INVENTION

The present invention discloses a torch construction in which the collet consists of a section of tubing of predetermined length having one end slotted for gripping the electrode within the torch head. The collet body and torch cap is designed with tapered walls to support the simple tubular collet in a manner which provides for automatic centering of the electrode. To assure concentricity with the longitudinal axis of torch and to avoid twisting at the slotted end of the collet the tapered walls in the torch cap should form an included angle which is substantially greater than the included angle provided by the tapered walls of the collet body.

Therefore, it is the primary object of the present invention to provide an improved welding or cutting torch construction with a disposable collet of low manufacturing cost.

It is another object of the invention to provide a torch and collet assembly which eliminates the need for machining the outside diameter of the collet or for having different size torch caps.

Figure 2:
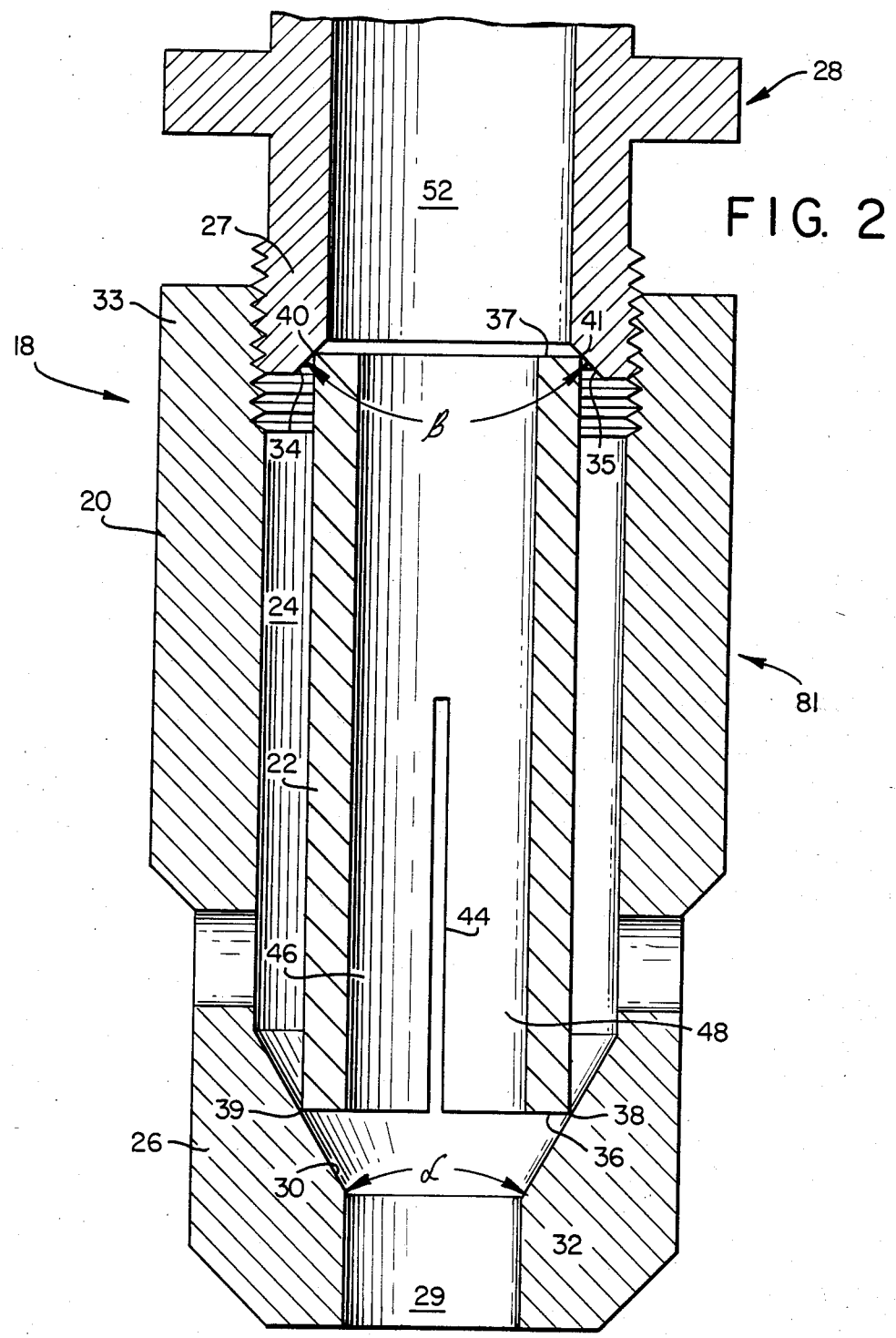

Other objects and advantages of the present invention will become apparent from the following detailed description of the invention when read in conjunction with the accompanying drawings of which:

FIG. 1 is a vertical cross-section through a gas shielded arc TIG torch constructed in accordance with the teaching of the present invention; and FIG. 2 is an enlarged schematic view in cross section of the arrangement between the collet, collet body and torch cap of the gas shielded arc torch of FIG. 1.

Referring now to FIGS. 1 and 2 inclusive in which the TIG welding torch 10 of the present invention is shown including a torch head 12 neck 14 and handle 16 respectively. The torch head 12 has a barrel shaped geometry and lies at an inclined angle relative to the torch neck 14. The torch neck 14 is a narrow tubular section which couples the handle 16 to the head 12. The head 12 and neck 14 of the torch are preferably formed as an integral unit from an insulating material of any suitable plastic composition. The handle 16 also suitably of plastic extends from the neck 14 and is adapted to be held in the hand by an operator for manipulating the torch 10.

The torch head 12 surrounds a collet assembly 18 for gripping and positioning an electrode E relative to the longitudinal axis of the head 12. The collet assembly 18 also serves to direct the passage of shielding gas from the neck 14 of the torch 10 through the torch head 12.

The collet assembly 18 includes a collet body 20 and a collet 22. The collet 22 is supported within a bore 24 in the collet body 20 between the front end 26 of the collet body 20 and the lower end 27 of a manually adjustable torch cap 28. The front end 26 of the collet body 20 includes an opening 29 though which the electrode passes and further includes in cross section tapered wall surfaces 30 and 32 which intersect to form a vee having an included angle $\alpha$ in a range of between 30 to 75 degrees with sixty (60) degrees being preferred. The torch cap 28 is threadably engaged at its lower end 27 to the rear end 33 of the collet body 20. The lower end 27 of the torch cap 28 is tapered to provide in cross section beveled wall surfaces 34 and 35 which intersect to form a vee having an included angle $\beta$. To facilitate sliding between the collet 22 and the torch cap 28 at the beveled surfaces 34 and 35 when the torch cap 28 is tightened the included angle $\beta$ should be substantially larger than the included angle $\alpha$. The included angle $\beta$ is preferably about 90 degrees. The vee formed by the tapered wall surfaces 34 and 35 is arranged to form the mirror image of the vee between the tapered wall surfaces 30 and 32 with the apex of each coaxially aligned with the longitudinal axis of the torch head. The opposite ends 36 and 37 of the collet 22 is supported between the tapered wall surfaces 30, 32 and 34, 35 with the collet 22 held to a coaxial alignment with the collet body 20.

The collet 22 is preferably fabricated from metal tubing of a desired diameter which is cut to a desired length and slotted at one end. Any conductive metal such as copper is preferred. The ends 36 and 37 of the collet form rectangular edges 38, 39, 40 and 41. No machining operation is necessary to bevel off any of the edges 38, 39, 40 and 41. The slot 44 in the collet 22 forms collet fingers 46, 48 for securely gripping an electrode E when a force is applied against the collet fingers. Since the collet 22 is simply a cylindrical tube having a slotted end the cost of manufacture is minimal. An alternate method for constructing the collet 22 is to start with a metal sheet and blank out a rectangular section with two or more slots 44. After blanking the rectangular section should be rolled into a tubular geometry. It can be seam welded at the mated edge if increased rigidity is needed. The resulting collet will have a tubular body as shown in FIG. 2 with straight squared off ends 36 and 37.

The collet 22 is inserted in the bore 24 of the collet body 20 with the square edges 38 and 39 engaging the tapered surfaces 30 and 32 and with the square edges 40 and 41 engaging the tapered surfaces 34 and 35. Upon tightening the torch cap 28 the tapered surfaces 34 and 35 will automatically cause the collet 22 to slide until it is centered in the bore 24. Sliding should occur only at the unslotted end of the collet 22 and without twisting forces on the collet fingers 46, 48. This is realized by making the included angle β much larger than the included angle α and resulting in minimal twisting and more efficient transfer of current at the slotted end of the collet 22. The force applied by turning down the torch cap 28 is transmitted to the front end 26 of the collet body 20 to cause the fingers 46,48 of the collet 22 to move inwardly and grip the electrode E. The collet 22 is not restricted to one outside diameter size. In fact different outside diameter collets may be used without changing the size of the torch cap 28.

The torch cap 28 includes a knob 50 for tightening the cap 28 and adjusting the degree of pressure applied to the collet 22. The torch cap 28 has a recessed bore 52 which is concentric with the longitudinal axis of the torch head 12 and is adapted to accommodate the opposite end of the electrode E. The lower end 27 of the torch cap 28 is machined down to a smaller diameter than the outside diameter of the collet body 20 to provide a clearance 56 between the torch cap 28 and the rear end 33 of the collet body 20 which allows the cap 28 to be controllably tightened into the collet body 20.

The diameter of the collet 22 is smaller than the diameter of the bore 24 for providing an annulus 48 therebetween. Shielding gas is directed from a supply tube 52 extending from the neck 14 of the torch 10 into the annulus 48. The supply tube 52 engages a counterbore 53 in the collet body with the annulus 48 communicating with the supply tube through a drilled opening 55 in the collet body. The supply tube 52 is of an electrically conducting material for also supplying electrical power to the metal collet body from a source of power (not shown) in a conventional fashion. The collet body 20 also includes a plurality of gas discharge holes 60 arranged circumferentially about the collet body 20 adjacent to the front end 26. A conventional ceramic cup 62 is mounted over the collet body 20. The shielding gas is discharged from the annulus 48 through the holes 60 into the ceramic cup 62 whereupon it is redirected to form a shielding gas envelope about the electrode E.

The electrode E may be inserted into the collet 22 through the front end 26 of the collet body 20 provided the torch cap 28 is loosened. Alternatively the electrode E may be inserted through the rear end of the torch 10 by removal of the torch cap 28.

It has been found in accordance with the present invention that the squared off ends 36 and 37 of the collet 22 will after repeated usage cause one or more of the edges 38, 39, 40 and 41 to form a beveled near surface adjacent the corresponding tapered surfaces 30, 32, 34 and 35. Accordingly, although the edges may be machined to a beveled taper this operation is unnecessary.

I claim:

1. A gas shielding arc torch comprising a torch head surrounding a collet assembly including a collet body and a collet for gripping and positioning an electrode within said torch head and a removable torch cap for locking said collet within said collet body wherein said collet body has a bore within which said collet is disposed, a forward end having in cross section tapered surfaces forming a first vee with an included angle of between 30–75 degrees for engaging one end of said collet and a rearward end for engaging said torch cap, with said torch cap having in cross section tapered surfaces which form a second vee for engaging the opposite end of said collet, said second vee being disposed opposite to said first vee to form the mirror image thereof and having an included angle substantially larger than the included angle formed by said first vee and wherein said collet is a cylindrical hollow tube having squared off ends with one squared off end engaging the first vee and with the other squared off end engaging the second vee and having at least two slots extending from one of said squared off ends with the slotted end adapted to be positioned adjacent the forward end of said collet body.

2. A gas shielded arc torch as defined in claim 1 wherein the included angle of said second vee is about ninety degrees.

3. A gas shield arc torch as defined in claim 2 wherein the included angle of said first vee is about sixty degrees.

4. A gas shielded arc torch as defined in claim 3 wherein said collet has a diameter smaller than the bore of said collet body for forming an annulus between said collet and collet body.

5. A gas shielded arc torch as defined in claim 4 wherein said torch further comprises a tubular neck and handle with said torch head having a barrel shaped geometry which is disposed at an angle relative to said neck.

6. A gas shielded arc torch as defined in claim 5 wherein a tubular metal conduit extends from said neck into direct contact with said collet body for providing direct access from said conduit to said annulus for supplying shielding gas into said torch head and for providing electrical power to said electrode.

7. A gas shielded arc torch as defined in claim 6 wherein said torch cap is threadably engaged to said rearward end of said collet body and includes a recess to accommodate said electrode.

* * * * *